United States Patent [19]

Ichikawa et al.

[11] 4,100,124
[45] Jul. 11, 1978

[54] SILICONE BINDING COMPOSITIONS USEFUL IN PREPARING GASKETS AND PACKINGS

[75] Inventors: Kunihiro Ichikawa; Terumi Mie, both of Ichihara; Isao Ona, Kimitsu, all of Japan

[73] Assignee: Toray Silicone Company, Ltd., Tokyo, Japan

[21] Appl. No.: 782,139

[22] Filed: Mar. 28, 1977

[30] Foreign Application Priority Data

May 6, 1976 [JP] Japan .................................. 51-50796

[51] Int. Cl.$^2$ .............................................. C08L 83/04
[52] U.S. Cl. ........................ 260/29.2 M; 260/37 SB
[58] Field of Search ...................... 260/37 SB, 29.2 M

[56] References Cited

U.S. PATENT DOCUMENTS

| | | | |
|---|---|---|---|
| 3,395,071 | 7/1968 | Nitzsche et al. | ............ 260/29.2 M X |
| 3,706,695 | 12/1972 | Huebner et al. | ............ 260/29.2 M X |
| 3,817,894 | 6/1974 | Butler et al. | .................... 260/29.2 M |

*Primary Examiner*—Lewis T. Jacobs
*Attorney, Agent, or Firm*—Robert L. McKellar

[57] ABSTRACT

Silicone compositions which are useful as binders for fibrous gasketing and packing materials are disclosed. Such silicone compositions are a mixture of hydroxyl end-blocked diorganosiloxanes, a crosslinking silane, catalysts, emulsifiers and water.

5 Claims, No Drawings

SILICONE BINDING COMPOSITIONS USEFUL IN PREPARING GASKETS AND PACKINGS

This invention deals with silicone compositions which are useful for binding together fibrous materials to form gaskets, packing material and the like.

More specifically, siloxanes which can be emulsified are treated with specific silanes and these siloxanes are filled with fibrous materials, molded and cured to give materials useful for gasketing and packing.

Such gasketing and packings find utility in automobile, construction machine and marine engines.

Prior art gasketing materials consisted of combining fibrous materials, such as asbestos or paper, with nitrile-butadiene, styrene-butadiene or chloroprene rubber polymers in emulsion form. These products, however, have serious problems in practical use since they have inferior heat resistance, water resistance, and oil resistance properties and inferior sealing and surface release characteristics.

Some presently used gaskets and packings are produced by stamping out paper or asbestos sheets and treating the stamped forms with silicone oils, varnishes or rubbers. These gaskets, however, show insufficient sealing abilities because of the lack of flexibility.

There are also used as surface treatments, silicone emulsions which contain hydroxy endblocked diorganopolysiloxanes and organohydrogenpolysiloxanes but these materials also suffer from poor sealing ability and in addition are not durable because of inferior physical strength and poor adhesion. Further, one has to content with the formation of spongy polymer caused by the entrapment of evolved hydrogen from the cure reaction of that material.

The instant invention gives the high strength and strong adhesion requirements for gasketing for automotive, construction machine and marine engines.

The instant invention consists of a silicone composition which is a mixture of (A) 100 parts by weight of an $\alpha,\omega$-dihydroxydiorganopolysiloxane having a viscosity of at least 100 cs. at 25° C., (B) 5–150 parts by weight of a silane of the general formula $$RSi(OR')_3$$

wherein R is a substituted or unsubstituted monovalent hydrocarbon radical, R' is an aliphatic hydrocarbon radical containing 1 to 4 carbon atoms, (C) 0.1–15 parts by weight of an organometallic catalyst, (D) 1–20 parts by weight of an emulsifying agent and, (E) 50–1000 parts by weight of water.

Component (A) of this invention, the $\alpha,\omega$-dihydroxydiorganopolysiloxanes, are well-known articles of commerce and need not be described in great detail. For purposes of this invention, component (A) can be linear or slightly branched linear polymers having methyl, ethyl, propyl, vinyl and phenyl groups attached to the silicon atoms. These diorganopolysiloxanes should contain at least two hydroxyl groups attached to silicon atoms and the viscosity of such siloxanes should be at least 100 cs. at 25° C. Preferred polymers are linear polymers. Preferred groups on silicon are methyl groups. The preferred range of viscosity is from 20,000 to 300,000 cs. at 25° C.

Component (B), the silanes, have the general formula $$RSi(OR')_3$$

where R is selected independently from methyl, ethyl, propyl, vinyl, phenyl, $\gamma$-chloropropyl, p-chlorophenyl, p-methylphenyl, $\gamma$-glycidoxypropyl, $\beta$-(3,4-epoxycyclohexyl)ethyl, $\gamma$-aminopropyl, $\gamma$-ethylaminopropyl and $\gamma$-methacryloxypropyl groups, etc. and R' is selected independently from methyl, ethyl, propyl, butyl, vinyl and methoxyethyl groups, etc.

By way of example, the silanes can be ethyltriethoxysilane, amyltriethoxysilane, vinyltriethoxysilane, phenyltriethoxysilane, methyltriethoxysilane, vinyltrimethoxysilane, methyltrimethoxysilane, methyltri(methoxyethoxy)silane, $\beta$-(3,4-epoxycyclohexyl)ethyltrimethoxysilane, $\gamma$-glycidoxypropyltrimethoxysilane, $\gamma$-aminopropylmethoxysilane, etc. Especially desirable examples are methyltrimethoxysilane and $\gamma$-glycidoxypropyltrimethoxysilane.

Component (C), the organometallic catalysts, are heavy metal salts of organic acids such as dibutyltin diacetate, dibutyltin dilaurate, dioctyltin dilaurate, dibutyltin dioctanoate, zinc naphthenate, cobalt naphthenate, zinc octanoate, tin octanoate, cobalt octanoate, dioctyltin diisooctylmercaptoacetate, dibutyltin diisooctylmercaptoacetate, and the organic acid salts of manganese, lead and iron. In addition, organotitanate esters such as tetrabutylorthotitanate, tetrapropylorthotitanate, can also be used.

Component (D), the emulsifying agents, are nonionic surfactants, anionic surfactants, cationic surfactants or ampholytic surfactants usually used for emulsification of silicone oil or for the emulsion polymerization of silicones. Examples of these types of emulsifiers are aliphatic acid esters of glycerine, aliphatic acid esters of polyethylene glycol, aliphatic acid esters of polypropylene glycol, aliphatic acid esters of sorbitan, polyethyleneglycol alkylphenyl ethers, alcohol sulfuric ester salts and alkylbenzenesulfonic acid salts.

The binder of this invention is prepared by preparing an $\alpha,\omega$-dihydroxydiorganopolysiloxane emulsion at first either by the direct emulsification of an $\alpha,\omega$-dihydroxydiorganopolysiloxane in water using an emulsifier, or by the preparation of a solution in organic solvent such as xylene or trichloroethylene, followed by emulsification with water in the presence of some emulsifying agent, or in still another way, by an emulsion polymerization of the cyclic tetramer or cyclic trimer of a precursor siloxane. Component (B) the silane and an organometallic catalyst as component (C) may either be directly added and mixed by stirring, or they may be added after they are emulsified with some emulsifying agent and then added to the emulsion of component (A), or in an alternative method, they may be added after they are dissolved in some organic solvent such as xylene, trichloroethylene or ethanol. Any method by which components (A)–(E) can be mixed homogeneously to form a stable emulsion may be used. In this mixing, the amount of component (B) should be 5–150 parts by weight, preferably 15–120 parts to 100 parts by weight of component (A). Component (C) should be 0.1–15 parts by weight, or, preferably, 1–8 parts by weight. Component (D) should be present at 1–20 parts. There is no special restriction on the amount of component (E), but a range of 50–1000 parts by weight is recommended.

In addition to the above essential and indispensable components, there may be added secondary components such as dyes, organic solvents, preservatives, emulsification stabilizers, dimethylpolysiloxane oils which have been blocked at both ends with trimethylsilyl groups, silicone copolymers which are composed of trimethylsiloxane units and SiO$_2$ units and in which the ratio of methyl groups to silicon atoms is 0.5:1-2.5:1. Such materials, however, should not be present in large amounts i.e. greater than 10 percent by weight.

When a binder for gaskets and packing proposed by this invention is to be used, it is diluted with water as needed, and then a material like paper pulp, asbestos, linen, or the like, which has been shredded into fibers, is added to this solution to form a slurry. This slurry is made into a sheet using a paper manufacturing press. Then the sheet is compressed, dried, and then thermally cured. In this procedure, gaskets and packings which have excellent heat resistance, sealing characteristics and surface release characteristics, are produced. If necessary, this type of binder may be used in combination with known binders such as nitrile-butadiene rubber emulsion.

The invention will be explained specifically in the following examples. In these examples, "%" and "parts" refer to wt % and parts by weight. All the values for viscosity in the examples are those measured at 25° C. Tests and test conditions were as follows: The test machine as an Instron tension meter. The test pieces were filter Paper No. 131 made by Toyo Roshi, Co., Japan. They were 1 mm thick and 20 cm in width rectangles. Dry tensile strengths were tested at a tension speed of 30 cm/min. at a guage length of 10 cm. Wet tensile strength was measured immediately after water immersion for 30 min. at 25° C. The peel strengths were made on overlap "Nichiban" adhesive tape on a test piece by placing a metal weight having a 10 gm/sq. cm. weight on the adhesive tape which was overlapped on a test piece for 24 hours. The peel strength was then measured at a tension speed of 30 cm/min. and drawn at an angle of 180° to the surface. The data was taken from an average of 5 measurements.

EXAMPLE 1

100 parts of α,ω-dihydroxydimethylpolysiloxane emulsion containing 20% of polysiloxane with a viscosity of 250,000 cSt and an emulsifier, glyceryl stearate, were added to an emulsion of methyltriethoxysilane (see Table I for the amounts added) and 4 parts of dibutyltin diacetate. The concentration of dibutyltin diacetate was 20%. (sodium alkylbenzenesulfonate was used as the emulsifier for the catalyst). After being stirred, the mixture was poured into a metal mold. After the water had evaporated, the mixture was thermally cured at 150° C. for 10 minutes to produce a rubber sheet. This material was designated A. As a control example, a conventionally used binder, a self-crosslinking styrene-butadiene rubber emulsion, was similarly cured to obtain a rubber sheet. This was designated B. Another control example containing 100 parts of α,ω-dihydroxydimethylpolysiloxane emulsion having a concentration of polysiloxane of 35% and a viscosity of 200,000 cSt and an emulsifier, glyceryl stearate, were combined and stirred with 10 parts of a methylhydrogenpolysiloxane emulsion (polysiloxane concentration was 35%) and 4 parts of dibutyltin diacetate emulsion (concentration of dibutyltin diacetate was 20%) and sodium alkylbenzene sulfonate was used as an emulsifier). This material was designated C. The resultant conventional silicone binder was also cured in a manner similar to the above examples to form rubber sheets. These rubber sheets were subjected to strength and elongation measurements with a tensile tester. The results of the measurements are shown in Table I. The rubber sheets of this invention composed of α,ω-dihydroxydimethylpolysiloxane, methyltriethoxysilane and dibutyltin diacetate showed higher tensile strengths than those of the rubber sheets made with conventional binders. In addition, the sheets did not tend to foam. The results are on Table I.

Table 1

|  | Parts of MeSi(OCH$_2$CH$_3$)$_3$ | Tensile strength kg/cm$^2$ | Elongation % | Foam |
|---|---|---|---|---|
| Sample A | 5 | 11.0 | 300 | None |
| Sample A | 10 | 16.6 | 250 | " |
| Sample A | 15 | 17.6 | 200 | " |
| Sample A | 20 | 24.0 | 140 | " |
| Sample B | — | 5.2 | 300+ | " |
| Sample C | — | 2.7 | — | Extensive |

EXAMPLE 2

100 parts of α,ω-dihydroxydimethylpolysiloxane emulsion containing 35% polysiloxane having a viscosity of 20,000 cSt and an emulsifier, polyethylene glycol lauric acid ester were added to 5 parts of γ-glycidoxypropyltrimethoxysilane and 6 parts of dibutyltin dilaurate emulsion (concentration of dibutyltin dilaurate was 20%); containing an emulsifier, sodium alkylbenzenesulfonate. After the mixture had been stirred, the emulsion was put in an aluminum dish. After the water had evaporated, the mixture was thermally cured at 150° C. for 10 minutes and a rubber film was obtained. This rubber film did not tend to foam, had a high tensile strength and could be suitably stretched. This rubber film was placed between two pieces of iron in a 60%-compressed state for 20 days. When the iron pieces were removed after 20 days, the rubber film could be easily separated from the iron plates. The results indicated that this rubber was suitable as a binder for gaskets and packings. In addition to the above experiment, thoroughly shredded asbestos fibers were put into the above-mentioned binder bath. After being thoroughly stirred, the excess emulsion was squeezed out to form a sheet. After the sheet was dried, it was thermally cured at 150° C. for 15 minutes. It was apparent that the asbestos fibers had been well bonded in the cured sheet since the sheet was sufficiently elastic and tough. There were also no problems in separating the material from the metal surfaces because the products were not sticky. The sheets thus proved to be suitable for gaskets and packings.

EXAMPLE 3

By the emulsion polymerization of cyclic tetramer siloxane, an α,ω-dihydroxydimethylpolysiloxane emulsion was obtained (concentration of polysiloxane was 35%, polysiloxane viscosity was 100,000 cSt); containing an emulsifier, sorbitan palmitate. 100 parts of this emulsion and 2 parts of γ-aminopropyltrimethoxysilane, were added and thoroughly stirred with 15 parts of a methyltrimethoxysilane and 7 parts of zinc octanoate emulsion. The concentration of zinc octanoate was 20%; the emulsifier was sodium dodecyl sulfate. The mixture was diluted to prepare baths in which the silicone concentrations were 10%, 20% and 30%. Pieces of paper for gaskets and packings (thickness: 1mm; width: 200mm) were immersed in these baths for 10 minutes, and after being removed from the baths, they were dried in air for 10 minutes. Later they were thermally cured at 150° C. for 10 minutes. Next, the following measurements were made: the percentage of binder adhering, the tensile strength in the dried state and the tensile strength in the wet state. As a control example, an untreated piece of paper for gaskets and packings was subjected to the same tensile strength tests. Then, commercially available cellophane tape was applied to paper pieces separately prepared according to the procedures described above. The peeling strengths of these papers were measured.

As shown in Table II, the pieces of paper for gaskets and packings which had been treated with the silicone binder of this invention demonstrated a high wet tensile strength and a low peeling strength and proved to be suitable for gaskets and packings.

Table II

| Sample | Adhesion | Dry Tensile Strength kg/cm$^2$ | Wet Tensile kg/cm$^2$ | Peel Strength gm/1.8 cm |
| --- | --- | --- | --- | --- |
| None | 0 | 40 | 2 | 100+ |
| Example 3 at 10% silicone | 14 | 48 | 14 | 5.4 |
| Example 3 at 20% | 27 | 70 | 33 | 2.6 |
| Example 3 at 30% | 47 | 76 | 36 | 2.1 |

That which is claimed is:

1. A composition of matter which is useful in preparing gaskets and packings which consists essentially of
    (A) 100 parts by weight an an $\alpha,\omega$-dihydroxydiorganopolysiloxane having a viscosity of at least 100 cs. at 25° C.,
    (B) 5–150 parts by weight of a silane of the general formula $$RSi(OR')_3$$

wherein R is a substituted or unsubstituted monovalent hydrocarbon radical, R' is an aliphatic hydrocarbon radical containing 1 to 4 carbon atoms,
    (C) 0.1–15 parts by weight of an organometallic catalyst,
    (D) 1–20 parts by weight of an emulsifying agent and
    (E) 50–1000 parts by weight of water,
    (F) sufficient solid gasketing material to form a gasket.
2. A composition of matter as claimed in claim 1 in which the solid gasketing material is in fibrous form.
3. A composition of matter as claimed in claim 2 which contains asbestos fibers as the solid gasketing material.
4. A composition of matter as claimed in claim 2 which is cured.
5. A composition of matter as claimed in claim 1 which contains pulp paper as the solid gasketing material.

* * * * *